United States Patent
Sun et al.

(10) Patent No.: US 12,285,872 B2
(45) Date of Patent: *Apr. 29, 2025

(54) ROBOTIC SYSTEM SIMULATION ENGINE

(71) Applicant: Dexterity, Inc., Redwood City, CA (US)

(72) Inventors: Zhouwen Sun, San Mateo, CA (US); William Arthur Clary, Pasadena, CA (US); Kevin Jose Chavez, Redwood City, CA (US); Ben Varkey Benjamin Pottayil, Fremont, CA (US); Rohit Arka Pidaparthi, Mountain View, CA (US); Roger Lam Hau, San Carlos, CA (US); Samir Menon, Menlo Park, CA (US)

(73) Assignee: Dexterity, Inc., Redwood City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/428,427

(22) Filed: Jan. 31, 2024

(65) Prior Publication Data

US 2024/0165808 A1 May 23, 2024

Related U.S. Application Data

(63) Continuation of application No. 17/034,902, filed on Sep. 28, 2020, now Pat. No. 11,931,902.

(60) Provisional application No. 62/926,172, filed on Oct. 25, 2019.

(51) Int. Cl.
*B25J 9/16* (2006.01)

(52) U.S. Cl.
CPC .......... *B25J 9/1671* (2013.01); *B25J 9/1612* (2013.01); *B25J 9/163* (2013.01); *B25J 9/1661* (2013.01); *B25J 9/1674* (2013.01); *B25J 9/1697* (2013.01)

(58) Field of Classification Search
CPC ........ B25J 9/1671; B25J 9/1612; B25J 9/163; B25J 9/1661; B25J 9/1674; B25J 9/1697; B25J 9/161; B25J 9/1664; B25J 13/006; Y02P 90/02
See application file for complete search history.

(56) References Cited

U.S. PATENT DOCUMENTS

| | | |
|---|---|---|
| 8,401,698 B2 | 3/2013 | Kamrani |
| 9,238,304 B1 | 1/2016 | Bradski |
| 9,248,571 B2 | 2/2016 | Amberg |

(Continued)

FOREIGN PATENT DOCUMENTS

| | | |
|---|---|---|
| JP | H08241105 | 9/1996 |
| JP | 2003044547 | 2/2003 |

(Continued)

*Primary Examiner* — Abby Y Lin
*Assistant Examiner* — Danielle M Jackson
(74) *Attorney, Agent, or Firm* — Van Pelt, Yi & James LLP

(57) ABSTRACT

Techniques are disclosed to use robotic system simulation to control a robotic system. In various embodiments, a communication indicating an action to be performed by a robotic element is received from a robotic control system. Performance of the action by the robotic element is simulated. A state tracking data is updated to reflect a virtual change to one or more state variables as a result of simulated performance of the action. Successful completion of the action by the robotic element is reported to the robotic control system.

20 Claims, 10 Drawing Sheets

(56) References Cited

U.S. PATENT DOCUMENTS

| | | | |
|---|---|---|---|
| 9,409,294 | B1 | 8/2016 | Shapiro |
| 9,417,625 | B2 | 8/2016 | Graca |
| 9,840,007 | B1 | 12/2017 | Kuffner |
| 10,399,778 | B1 | 9/2019 | Shekhawat |
| 10,926,408 | B1 | 2/2021 | Vogelsong |
| 2002/0069674 | A1* | 6/2002 | Guy .................... C03B 37/0253 65/378 |
| 2007/0106421 | A1 | 5/2007 | Kamrani |
| 2014/0148949 | A1 | 5/2014 | Graca |
| 2017/0097631 | A1 | 4/2017 | Linnell |
| 2018/0056505 | A1 | 3/2018 | Kuffner |
| 2018/0079078 | A1 | 3/2018 | Nagatsuka |
| 2019/0321974 | A1 | 10/2019 | Leon |
| 2020/0122321 | A1 | 4/2020 | Khansari Zadeh |

FOREIGN PATENT DOCUMENTS

| | | |
|---|---|---|
| JP | 2004151976 | 5/2004 |
| JP | 2019081204 | 5/2019 |
| JP | 2022552626 | 12/2022 |

\* cited by examiner

ROBOTIC SYSTEM SIMULATION ENGINE

CROSS REFERENCE TO OTHER APPLICATIONS

This application is a continuation of U.S. patent application Ser. No. 17/034,902 entitled ROBOTIC SYSTEM SIMULATION ENGINE filed Sep. 28, 2020, which claims priority to U.S. Provisional Patent Application No. 62/926,172 entitled ROBOTIC SYSTEM SIMULATION ENGINE filed Oct. 25, 2019, each of which is incorporated herein by reference for all purposes.

BACKGROUND OF THE INVENTION

Robotic kitting systems have been provided to assemble kits of similar and/or dissimilar items. Items to be included are selected from source locations, such as bins, shelves, or other receptacles, and place together in a destination receptacle, such as a box, bin, tray, or tote.

To achieve required throughput, it may be necessary or desirable in some contexts to use multiple robots working in coordination to perform a set of tasks, such as assembling many and/or varied kits. When multiple robots are used, the planning and control must achieve objectives such as avoiding collisions or interference and optimizing use of the robots to achieve desired throughput or other measures of performance.

Algorithms to plan and/or schedule robots to perform operations and tasks to achieve an overall objective may rely on simplifying assumptions to be able to generate a plan in a computationally and/or operationally practical amount of time.

BRIEF DESCRIPTION OF THE DRAWINGS

Various embodiments of the invention are disclosed in the following detailed description and the accompanying drawings.

DETAILED DESCRIPTION

Figure 1:
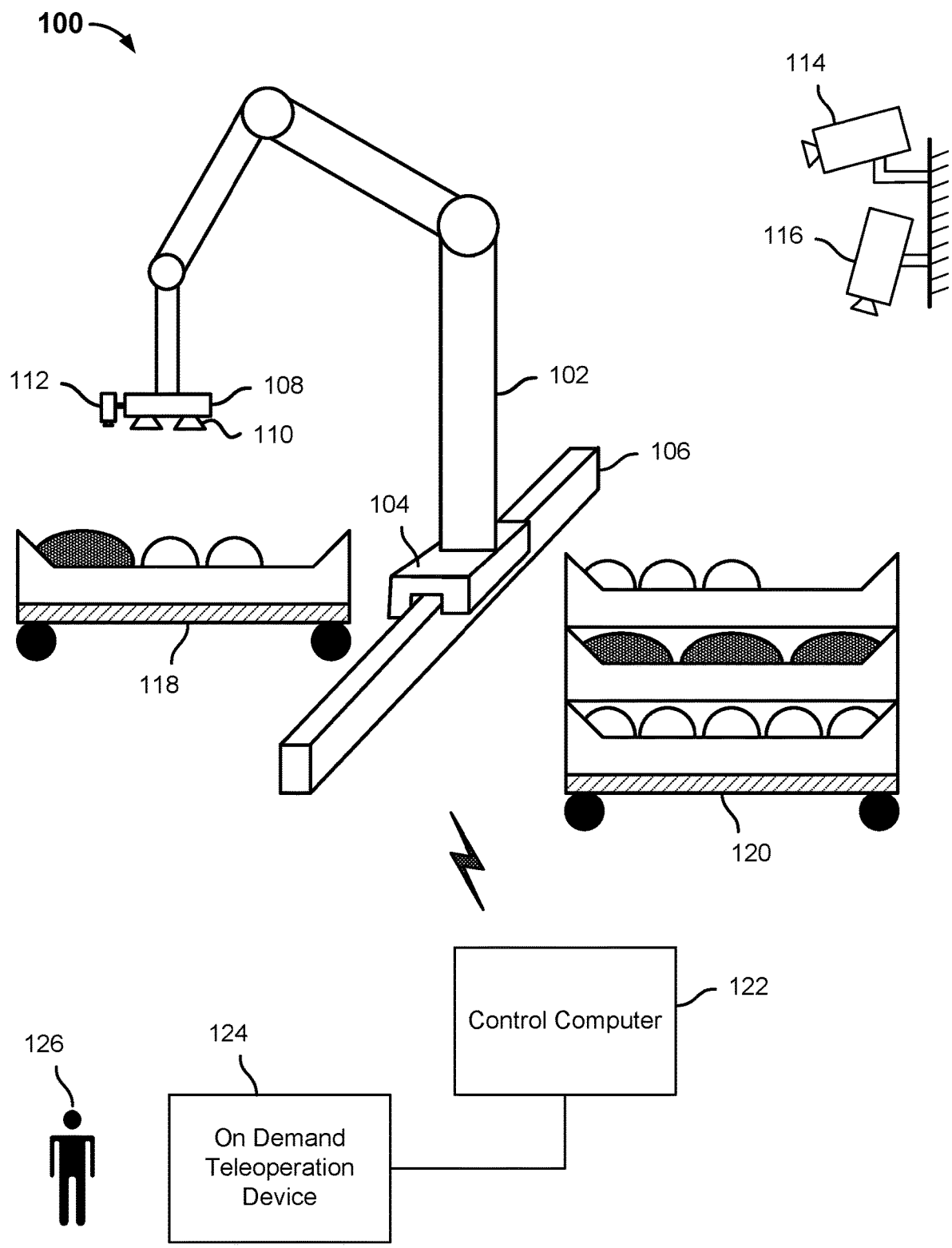
FIG. 1 is a block diagram illustrating an embodiment of a robotic system to pick and place items from source receptacles to destination receptacle.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A robotic system simulation engine is disclosed. Simulation engines model a system based on its attributes, physical dimensions, constraints, capabilities, performance characteristics, etc. In various embodiments, a robotic system simulation engine as disclosed herein is used to determine and coordinate use of a robotic system to perform a kitting operation. In some embodiments, multiple plans may be simulated to determine an optimal plan to be implemented. In some embodiments, a plan generated programmatically, e.g., by a scheduler or other system, module, or component, using a scheduling algorithm that relies at least in part on one or more simplifying assumptions is validated and/or refined by simulating operation of the robotic system according to the plan.

In some embodiments, simulation results may be used to provide a display, such as an animated sequence, to show visually how the operation will (or may/could) be performed, to demonstrate that a desired result, throughput, or other measure of performance can/will/would be achieved, etc.

In various embodiments, a robotic system simulation engine as disclosed herein models a multi-robot system. The simulation engine generates simulation results that in various embodiments are used to plan and implement robotic operations in which multiple robots are used to perform a set of kitting operations with required throughput, etc.

In various embodiments, process simulation is used to ensure that a robot installation/system meets throughput requirements and/or to help optimized robot picking and movement patterns to maximize throughput. In some embodiments, a process simulation is generated and/or regenerated/updated, e.g., as the environment changes, unexpected events occur, etc., to produce simulation results that enable the robotic system to validate that results expected and/or required to be achieved by the system will be achieved and/or to test alternative scenarios or plans to perform a set of tasks to select an optimal or more optimal solution.

In some embodiments, a kitting process simulation engine as disclosed herein may be used to provide a visual display, e.g., an animated sequence, to demonstrate/illustrate to a human user that a required throughput, objective, etc. can/will be achieved.

Figure 2:
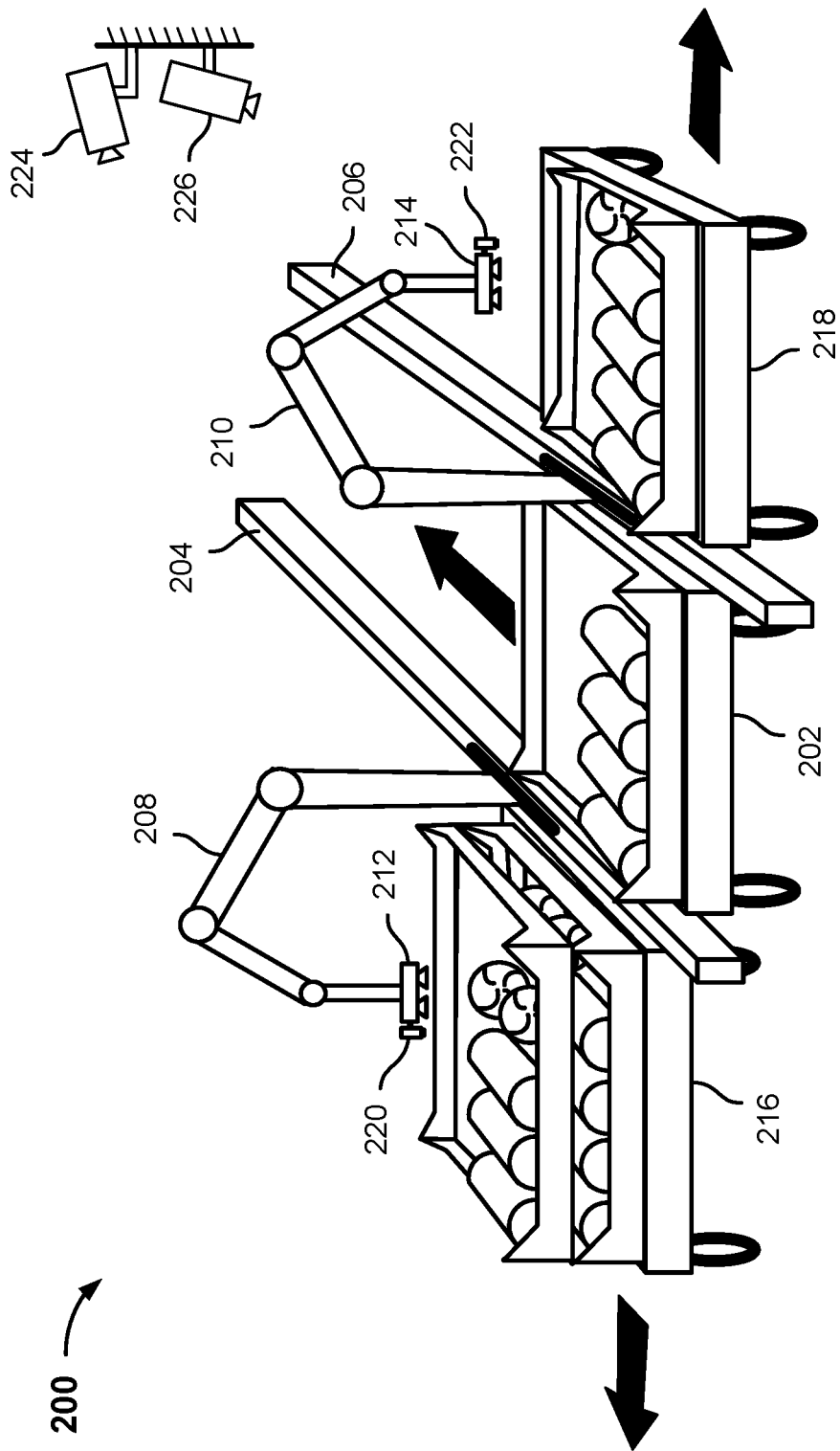
FIG. 2 is a diagram illustrating an embodiment of a robotic system.
Figure 3:
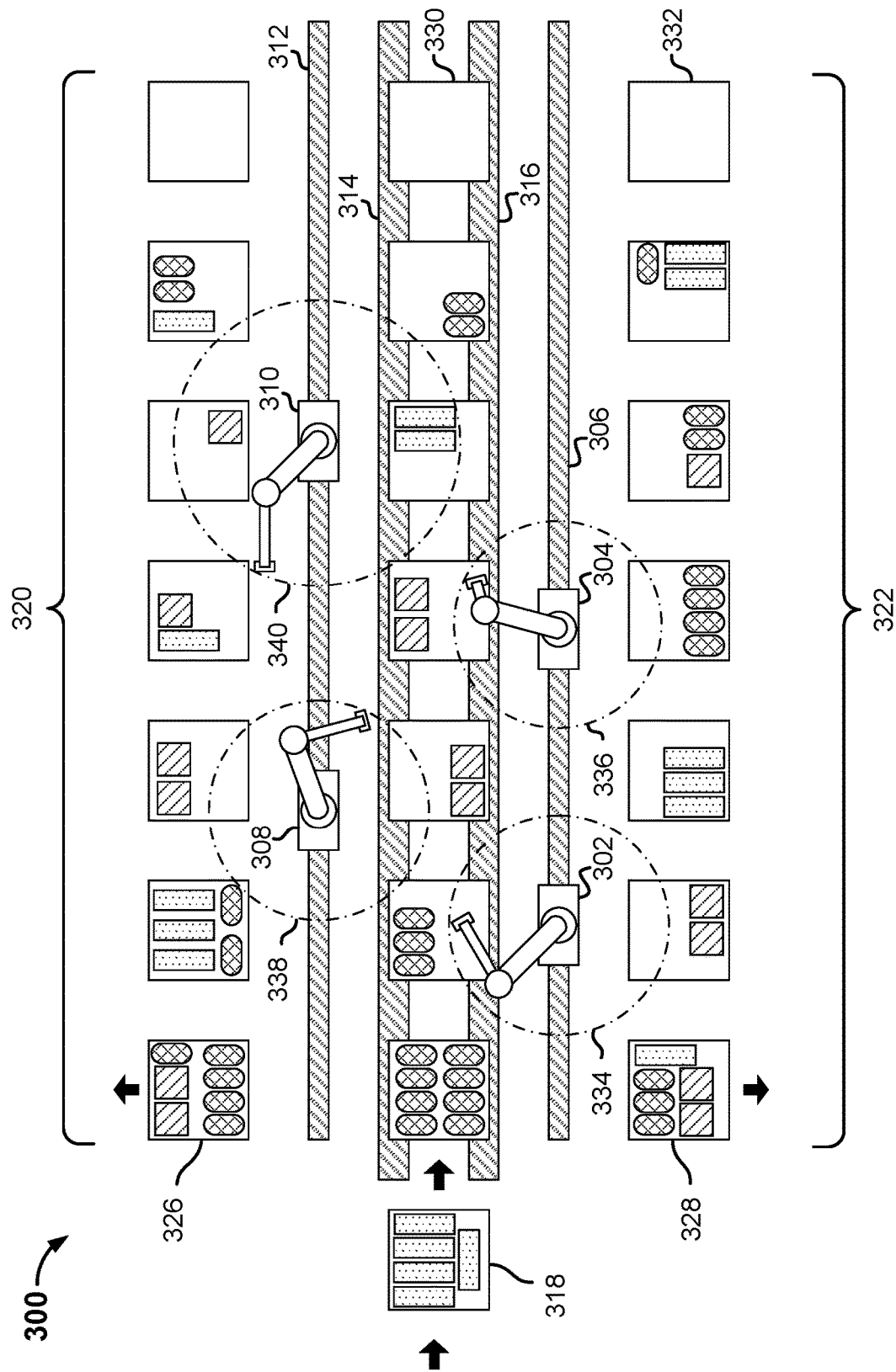
FIG. 3 is a block diagram illustrating an embodiment of a robotic system and workspace.

FIGS. 1 through 3 illustrate examples of robotic systems and associated workspaces in which a process simulation is used as disclosed herein to ensure that a robot installation/system meets throughput and/or other requirements and/or to help optimize robot picking and movement patterns to maximize throughput, avoid collisions, etc. While specific environments are shown in FIGS. 1 through 3, techniques disclosed herein may be used similarly to in other robotic workspaces, environments, and contexts, in various embodiments.

FIG. 1 is a block diagram illustrating an embodiment of a robotic system to pick and place items from source receptacles to destination receptacle. In the example shown, system 100 includes a robotic arm 102 rotatably mounted on a carriage 104 configured to translate along a rail 106. For example, carriage 104 may include a computer-controlled mechanical and/or electro-mechanical drive mechanism configured to be used, under robotic/computer control, to move the carriage 104 along rail 106, for example to reposition the robotic arm 102 to a desired position. In this example the robotic arm 102 is movably mounted on carriage 104 and rail 106, but in various other embodiments robotic arm 102 may be stationary or may be a fully or partly mobile other than via translation along a rail, e.g., mounted on a carousel, fully mobile on a motorized chassis, etc.

In the example shown, robotic arm 102 has an end effector 108 at its operative distal end (furthest from the carriage 104). End effector 108 comprises compliant vacuum (or "suction") cups 110. In various embodiments, suction cups 110 comprise silicone or another natural or synthetic material that is durable but also compliant enough to "give" at least slightly when they (first and/or gently) come in contact with an item the robotic system 100 is attempting to use robotic arm 102 and end effector 108 to grasp, e.g., via suction, such as bread or other soft and/or fragile items in non-rigid packaging, such as a plastic bag or wrapping.

In this example, the end effector 108 has a camera 112 mounted on the side of the end effector 108. In other embodiments, the camera 112 may be located more centrally, such as on the downward-facing face of the body of end effector 108 (in the position and orientation shown in FIG. 1). Additional cameras may be mounted elsewhere on robotic arm 102 and/or end effector 108, e.g., on arm segments comprising robotic arm 102. Additionally, cameras 114 and 116, mounted on a wall in this example, provide additional image data usable to construct a 3D view of the scene in which system 100 is located and configured to operate.

In various embodiments, robotic arm 102 is used to position the suction cups 110 of end effector 108 over an item to be picked up, as shown, and a vacuum source provides suction to grasp the item, lift it from its source location, and place it at a destination location.

In the example shown in FIG. 1, robotic arm 102 is configured to be used to pick arbitrary and in this example dissimilar items from source trays 120, such as bread items picked from a tray of items received from a bakery, and place them on a destination tray 118. In the example shown, destination trays 118 and source trays 120 comprise stackable trays configured to be stacked on a base with wheels at the four corners. In some embodiments, the trays 118 and/or 120 may be pushed into position by human workers. In some embodiments, the trays 118 and/or 120 may be stacked on motorized and/or robotically-controlled bases configured to be used to move stacks of bins into position to be picked from and/or placed to and/or to move completed stacks of trays to a staging and/or transport area to be loaded onto delivery vehicles for delivery to retail locations, for example. In some embodiments, other robots not shown in FIG. 1 may be used to push trays 118 and/or 120 into position to be loaded/unloaded and/or into a truck or other destination to be transported, etc.

In various embodiments, 3D or other image data generated by one or more of cameras 112, 114, and 116 may be used to generate a 3D view of the work area of system 100 and items within the work area. The 3D image data may be used to identify items to be picked/placed, such as by color, shape, or other attributes. In various embodiments, one or more of cameras 112, 114, and 116 may be used to read text, logos, photos, drawings, images, markings, barcodes, QR codes, or other encoded and/or graphical information or content visible on and/or comprising items within the work area of system 100.

Referring further to FIG. 1, in the example shown system 100 includes a control computer 122 configured to communicate, in this example via wireless communication (but in one or both of wired and wireless communication in various embodiments) with elements such as robotic arm 102, carriage 104, effector 108, and sensors, such as camera 112, 114, and 116 and/or weight, force, and/or other sensors not shown in FIG. 1. In various embodiments, control computer 122 is configured to use input from sensors, such as camera 112, 114, and 116 and/or weight, force, and/or other sensors not shown in FIG. 1, to view, identify, and determine one or more attributes of items to be loaded into and/or unloaded from trays 120 to trays 118. In various embodiments, control computer 122 uses item model data in a library stored on and/or accessible to control computer 122 to identify an item and/or its attributes, e.g., based on image and/or other sensor data. Control computer 122 uses a model corresponding to an item to determine and implement a plan to stack the item, along with other items, in/on a destination, such as trays 118. In various embodiments, the item attributes and/or model are used to determine a strategy to grasp, move, and place an item in a destination location, e.g., a determined location at which the item is determined to be placed as part of a planning/replanning process to stack items in/on the trays 118.

In the example shown, control computer 122 is connected to an "on demand" teleoperation device 124. In some embodiments, if control computer 122 cannot proceed in a fully automated mode, for example, a strategy to grasp, move, and place an item cannot be determined and/or fails in a manner such that control computer 122 does not have a strategy to complete picking and placing the item in a fully automated mode, then control computer 122 prompts a human user 126 to intervene, e.g., by using teleoperation device 124 to operate one or more of the robotic arm 102, carriage 104, and/or end effector 108 to grasp, move, and place the item.

FIG. 2 is a diagram illustrating an embodiment of a robotic system. In various embodiments, the robotic system 200 uses a robotic system simulation engine, as disclosed herein, to generate, validate, and refine plans to fulfill operational requirements, such as to pick and place diverse items from source receptacles to respective destination receptacles, according to a set of one or more manifests, orders, invoices, etc.

In the example shown, system 200 includes robotic arms 208 and 210 mounted to move under computer control along rails 204 and 206, respectively. Robotic arms 208 and 210 terminate in suction-type end effectors 212 and 214, respectively. In various embodiments, robotic arms 208 and 210 and end effectors 212 and 214 are controlled by a robotic control system comprising a control computer, such as control computer 122 of FIG. 1.

In the example shown in FIG. 2, robotic arms 208 and 210 and end effectors 212 and 214 are used to move items, such as loaves of bread, from source trays on a wheeled base 202 to destination trays on wheeled bases 216 and 218. In various embodiments, a human and/or robot may position the source trays and wheel base 202 into a starting location between rails 204 and 206, as shown. Wheeled base 202 may be advanced through the channel formed by rails 204 and 206, e.g., in the direction of the arrow starting at the far end of base 202 as shown. In various embodiments, base 202 may be advanced using one or both of the robotic arms 208 and 210; by being manually pushed by one or more human operators, one or more fixed or non-fixed robots, etc.; a conveyor belt or chain type mechanism running along and/or between the rails 204 and 206; a robotically controlled propulsion and/or conveyance mechanism incorporate into the base 202, such as computer-controlled motorized wheels and braking; etc.

As the wheeled base 202 advances along/between rails 204 and 206, and/or while base 202 is temporarily in a stationary position between rails 204 and 206, in various embodiments the robotic system uses robotic arms 208 and 210 and end effectors 212 and 214 are used to move items, such as loaves of bread, from source trays on a wheeled base 202 to destination trays on wheeled bases 216 and 218 according to a plan. For example, the plan may be computed based on inventory and/or sensor data indicating which type(s) of bread is/are available in the source trays on base 202 and/or on other bases in the work area and further based on manifests or other data indicating which mix of bread or other items are to be placed in destination trays for delivery to which respective ultimate delivery locations, such as retail stores.

In the example shown, once destination trays on bases 216 and 218 have been filled, bases 216 and 218 are moved outwardly away from the rails 204 and 206, respectively, for example to staging and loading areas to be loaded onto delivery vehicles.

While in FIG. 2 a single set of source trays on a single base 202 are shown, in various embodiments depending on the high level operation being performed one or more additional bases, each having zero or more trays full of items stacked thereon, may be located between rails 204 and 206 and/or in a staging area nearby. Likewise, in some embodiments multiple sets of destination trays, each on a corresponding wheeled base, may be stage adjacent to rail 204 or rail 206, and the topmost tray on each may be in the process of being filled simultaneously and/or in turn, e.g., according to a manifest and associated fulfillment plan.

In various embodiments, once a source tray is emptied, the system may use robotic arms 208 and/or 210 to move the tray to a staging area and/or to the top of a stack of destination trays, thereby creating a supply of trays to be filled and sent to end destinations and/or exposing a next source tray from which items can be picked to fulfill an order.

While in FIG. 2 a single robotic arm (208, 210) is disposed on each rail (204, 206), in some embodiments two or more robotic arms may be provided on each rail. IN some embodiments, two robotic arms on a single rail may be used to pick up and move empty trays. For example, each may be used to engage an opposite side of the tray, mechanically by engaging a structure of the tray or by suction or gripping in various embodiments, and the two arms may be operated cooperatively to maintain control of the empty tray while moving it to a new location, such as a buffer or staging area or the top of a stack of destination trays. In some embodiments, one or more robotic arms may be used to move a full or partly full tray from the top of a stack, e.g., to be moved to a staging area, to expose a tray lower in the stack, such as to add additional items, rearrange items according to a new or revised plan, etc.

Cameras 220 and 222, mounted on end effectors 212 and 214, respectively, and/or camera 224 and 226 are used in various embodiments to generate image data to plan and perform pick/place operations as disclosed herein.

FIG. 3 is a block diagram illustrating an embodiment of a robotic system and workspace. In various embodiments, the robotic system 300 uses a robotic system simulation engine, as disclosed herein, to generate, validate, and refine plans to fulfill operational requirements, such as to pick and place diverse items from source receptacles to respective destination receptacles, according to a set of one or more manifests, orders, invoices, etc.

In the example shown, system 300 includes robotic arms 302 and 304 mounted to move under computer control along rail 306 and robotic arms 308 and 310 mounted to move under computer control along rail 312. While two rail-mounted robotic are mounted on each of rails 306 and 312 in the example shown, in various embodiments more or fewer robotic arms may be mounted on each rail 306, 312. Similarly, a different number of robotic arms may be mounted on each rail. In various embodiments, simulations may be performed as disclosed herein using different numbers, locations, and configurations of robotic arms, and an arrangement and configuration may be selected and implemented based at least in part on the simulation results. For example, a number, arrangement, and configuration of robotic arms may be selected because it achieves an operational requirement while minimizing an applicable cost function relative to other combinations that were simulated.

In various embodiments, the robotic arms 302, 304, 308, and 310 may have the same or different end effectors. For example, in some embodiments, the items shown in FIG. 4 as being pick and placed by system 300 may comprises relatively light and fragile products encased in soft, deformable packaging, such as a plastic bag, e.g., bread or other bakery products. In such an embodiment, each of the robotic arms 302, 304, 308, and 310 may be equipped with a suction-type end effector, in which a vacuum is supplied to suction cups on an operative face or end of the end effector such that the plastic encasing the item to be picked and placed is sucked up into the suction cups, enabling the item to be lifted and moved by the robotic arm. In some embodiments, some of the robotic arms 302, 304, 308, and 310 may have suction type end effectors and others of them may have other types of end effector, such as a gripper type end effector. In various embodiments, the type(s) and mix of end effector may be selected based on the types of items to be picked and placed. In some embodiments, simulations as disclosed herein may be performed using different types, mixes, and locations of end effectors, and a type, mix, and placement of end effectors may be selected based at least in part on the simulation results. For example one or more types of end effector and the placement of each (e.g., which the end effectors is place on which of robotic arms 302, 304, 308, and 310) may be selected as a result of simulations indicating that arrangement achieved the best results.

In various embodiments, the system 300 of FIG. 3 operates in a manner similar to the robotic system 200 of FIG. 2, except that there are multiple robotic arms 302, 304, 308, 310 on each of rails 306 and 312. In various embodiments, stacks each comprising one or more pallets, trays, bins, and/or other stackable receptacles advance along a central path defined by guides or tracks 314 and 316. The stacks are fed into the central path from a staging location 318 to which stacks may be delivered by one or more of humans, robots, and other equipment. Upon enter the central path defined by guides or tracks 314 and 316, the stacks/receptacles are advanced in various embodiments by operation under robotic system control of a propulsion mechanism comprising or otherwise associated with the guides or tracks 314 and 316. For example, the guides or tracks 314 and 316 may comprise conveyors, pushers, belts, gears, chains, or other electromechanical structures to advance stacks of one or more trays or other receptacles along the central path defined by guides or tracks 314 and 316.

In the example shown, robotic arms 302, 304, 308, and 310 are used to pick items from topmost trays in stacks in the central path area defined by guides or tracks 314 and 316 and place items on topmost trays in stacks being assembled in output stack work areas 320 and 322. Completed stacks in areas 320 and 322, such as stacks 326 and 328 in the example shown, are moved out of the areas 320 and 322 and into other workspaces not shown in FIG. 3, such as staging areas to be transported to downstream destinations in other geographic locations.

As trays in the picking work area between rails 306 and 312 are emptied, e.g., tray 330, robotic arms 302, 304, 308, and 310 are used to move the empty trays to the top of a stack in the output work areas 320, 322, e.g., tray 332 in the example shown. For example, an empty tray may be placed on top of a stack of output trays that has not reached a maximum stack height and currently has a full tray on top of the stack, such that no more room remains to place items.

In various embodiments, the robotic system 300 of FIG. 3 is used to assemble stacks of trays for distribution to respective downstream destinations, each tray including a mix of one or more different types of items and the set of trays associated with each destination including collectively a mixture of items and for each item a quantity of that item corresponding with the destination. For example, in some embodiments the system 300 may be used at a bakery or associated central distribution center to fulfill and send to each of a plurality of retail outlets a corresponding set of baked goods each in a quantity ordered by or on behalf of that outlet.

In various embodiments, one or more computers and/or other processing elements, not shown in FIG. 3, are used to process orders, invoices, manifests, or the like and to generate and implement programmatically as disclosed herein, without human intervention, a plan to fulfill the requirements defined by the orders, invoices, etc. In various embodiments, the computer applies one or more scheduling algorithms to generate an initial plan, which is then validated and/or refined using a simulation engine, as disclosed herein. In various embodiments, the simulation engine models the behavior and operation of robotic elements, such as robotic arms 302, 304, 308, and 310, in light of constraints defined by the workspace, other robotic elements, and environmental factors, along with the geometry, capabilities, and performance characteristics of the robotic elements, to simulate how the system 300 will perform under the plan generated initially by the computer.

In various embodiments, the simulation engine and/or models take into consideration the need to avoid having robotics arms 302, 304, 308, 310 collide with each other or with objects in the environment or with other actors in the same workspace, such as human workers. For example, to avoid collisions and/or assess whether operations under a generated plan would result in (or have too high a risk of) collisions, the simulation engine may compute for each robotic arm 302, 304, 308, 310, in successive concurrent positions and poses of the respective robotic arms, for example, a corresponding swing circle, such as swing circles 334, 336, 338, and 340 in the example shown in FIG. 3. If the swing circles overlap at a given point in a simulation, in some embodiments, the system 300 flags that part of the plan for review (e.g., by a human user) and/or refinement, e.g., to generate a modified plan that does not result in such overlap. In some embodiments, the swing circles may be used to generate corresponding visual representations of such circles, e.g., in an animation or other visual representation of the simulation.

Figure 4A:
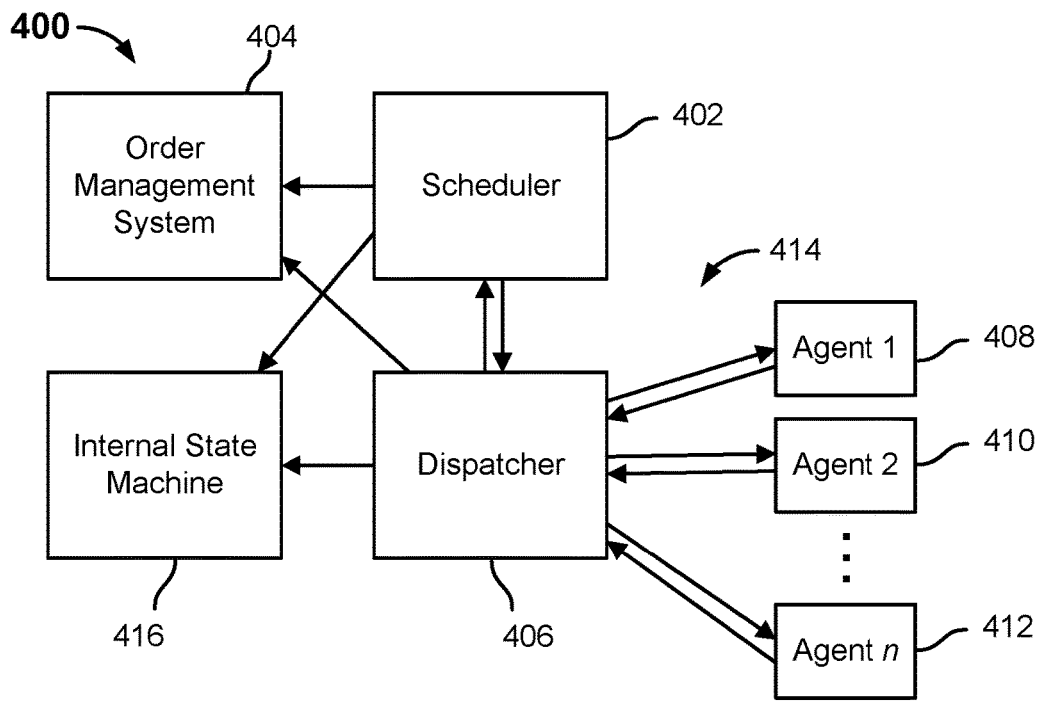
FIG. 4A is a block diagram illustrating an embodiment of a robotic control system.

FIG. 4A is a block diagram illustrating an embodiment of a robotic control system. In various embodiments, system 400 of FIG. 4 is used to control robotic elements in a physical workspace to fulfill a set of requirements, such as a set of invoices, orders, manifests, etc. associated with items to be delivered to respective downstream destinations. In some embodiments, the system 400 may be used to control robotic elements such as robotic arms 302, 304, 308, and 310 of FIG. 3.

In the example shown, system 400 includes a scheduler 402 configured to receive a set of orders from an order management system 404. Scheduler 402 may be implemented as a software component and/or set of processes configured to use order information from order management system 404 to generate, validate, and refine a plan to use a set of robotic elements to fulfill a set of requirements defined by the order information. Order management system 404 keeps track of order information (e.g. what customers have ordered which products in which quantities, what each has received, etc.)

In various embodiments, scheduler 402 gets system state from internal state machine 416, which keeps track of the system state (e.g., where all the products/items are, how tall input and output stacks of trays or other receptacles are, robot position and poses, etc.), and order information from order management system 404 and computes and provides to dispatcher 406 a schedule for the agents 408, 410, 412 to execute. For example, scheduler 402 may receive from order management system 404 a set or orders (manifests, invoices, etc.) indicating for each of a plurality of destinations (e.g., a set of retail outlets) a set of one or more items and a quantity of each to be delivered to that destination. In various embodiments, scheduler 402 may use one or more previously-known scheduling algorithms to generate an initial plan. The initial plan may be generated by making one or more simplifying assumptions.

The schedule generated by scheduler 402 is configured to be provided to and used by dispatcher 406 to implement the plan/schedule by operating robotic elements via a set of agents, represented in FIG. 4A by agents 408, 410, and 412.

Agents 408, 410, and 412 may comprises control software, drivers, and/or communication interfaces on/to one or more robotically-controlled elements (e.g., robotic arms, conveyors, etc.) and/or sensors (e.g., 3D or other cameras, optical code scanners, scales, pressure sensors, contact sensors, etc.).

In various embodiments, dispatcher 406 receives schedules from scheduler 402 (e.g., a list of action for the robots to execute) and communicates them (via agents 408, 410, 412) to the respective robots to do. The dispatcher 406 deals with error handling, unexpected or capricious behavior by robots, etc. After the scheduled actions are executed, the dispatcher 406 updates the internal state machine 416 and the order management system 404 and requests a new schedule.

The dispatcher 406 communicates with the agents 408, 410, 412 over interfaces 414. Dispatcher 406 sends specific control commands to the agents 408, 410, 412 over interfaces 414, and the agents 408, 410, 412 provide feedback over the same interfaces 414, e.g., reporting the success/failure of tasks, sensor readings (e.g., force sensors in a robotic arm), etc. The dispatcher 406 using information from scheduler 402 and feedback from the agents 408, 410, 412 to update and maintain an internal state machine 416.

In various embodiments, internal state machine 416 is used to maintain a current and consistent view of the state of elements comprising the system 400 and robotic elements controlled by system 400, e.g., via agents 408, 410, 412, including the location and state of items on which the robotic system operations, such as the trays and items picked/placed from and to trays in the example shown in FIG. 3. The state machine may be used to track the state and location of each tray and each order/manifest, for example, along with the location and state (e.g., pose) of each robotic arm or other robotic element comprising the system. The internal state machine 416 may be used to track the status of each order (e.g., not started, in progress, completed) and the location or other current disposition of the trays or other elements associated with each order.

Figure 4B:
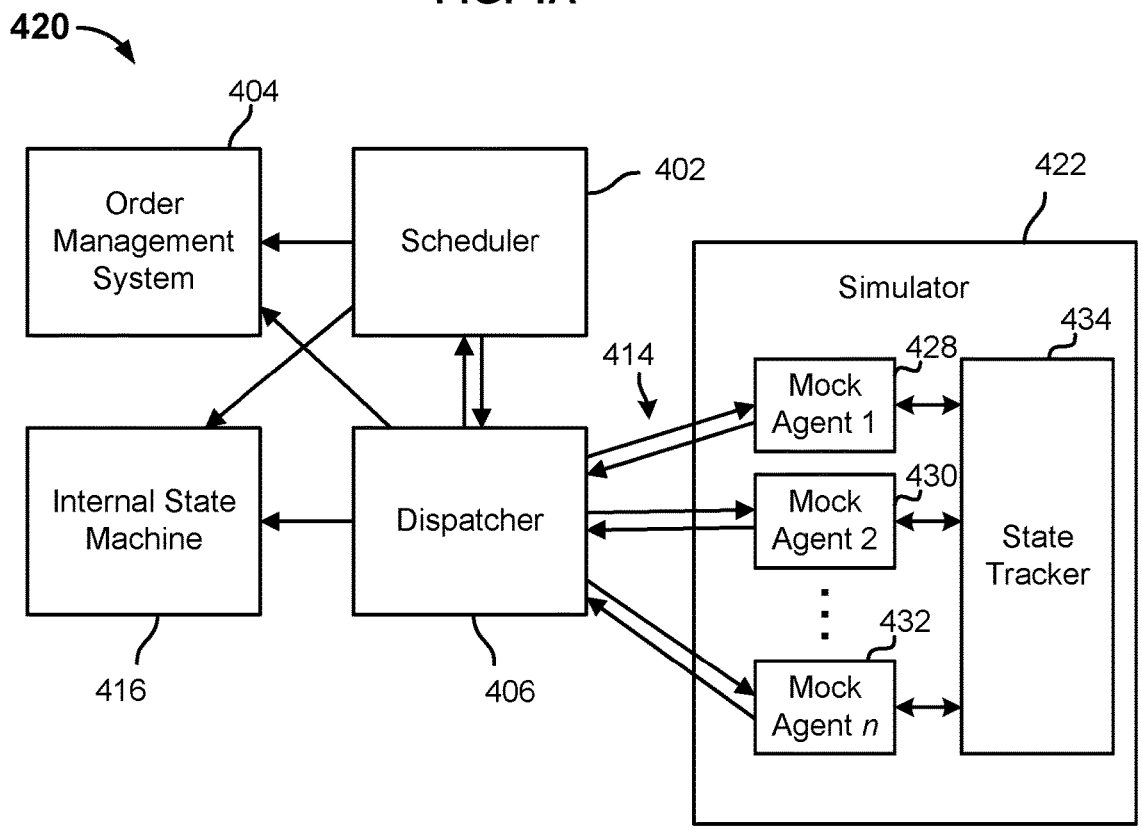
FIG. 4B is a block diagram illustrating an embodiment of a robotic system simulation engine.

FIG. 4B is a block diagram illustrating an embodiment of a robotic system simulation engine. In the example shown, the system 420 includes the same scheduler 402, order management system 404, dispatcher 406, and internal state machine 416. In the system 420, however, dispatcher 406 communicates via interfaces 414 with a simulator (sometimes referred to as a "simulation engine") 422. The simulator 422 includes a mock agent 428, 430, 432 corresponding to each real agent 408, 410, 412 of the system 400 of FIG. 4A, each configured to communicate with dispatcher 406 over a same interface 414 as its "real" (non-simulated) counterpart.

In various embodiments, the mock agents 428, 430, 432 are configured to respond to commands from the dispatcher 406 in the same manner as their real world counterparts. Each mock agent 428, 430, 432 uses a corresponding model and/or configuration file to simulate the behavior the robotic element it represents would exhibit in response to the command from dispatcher 406 and each generates and provides to dispatcher 406 a responsive communication comprising information the corresponding real world robotic element would be expected to return based on the simulated performance of the action(s) commanded by the dispatcher 406.

In the example shown, simulator 422 includes a state tracker 434 used to track the simulated state of the system. In various embodiments, the simulator 422 uses state tracker 434 to keep track of the system state independently of internal state machine 416. This state is used to estimate action completion times and is updated by mock agents 428, 430, 432.

The mock agents 428, 430, 432 are communicatively coupled to the state tracker 434 and may read state information from state tracker 434—e.g., to estimate the time the simulated agent would take to perform an assigned task/operation—and are configured to update the state tracker 434 with their own simulated state (e.g., position, trajectory, success/failure of tasks, etc.). In various embodiments, consistency logic comprising state tracker 434 ensures a consistent state is maintained, e.g., by detecting and preventing inconsistent updates from two or more of the mock agents 428, 430, 432.

Figure 5A:
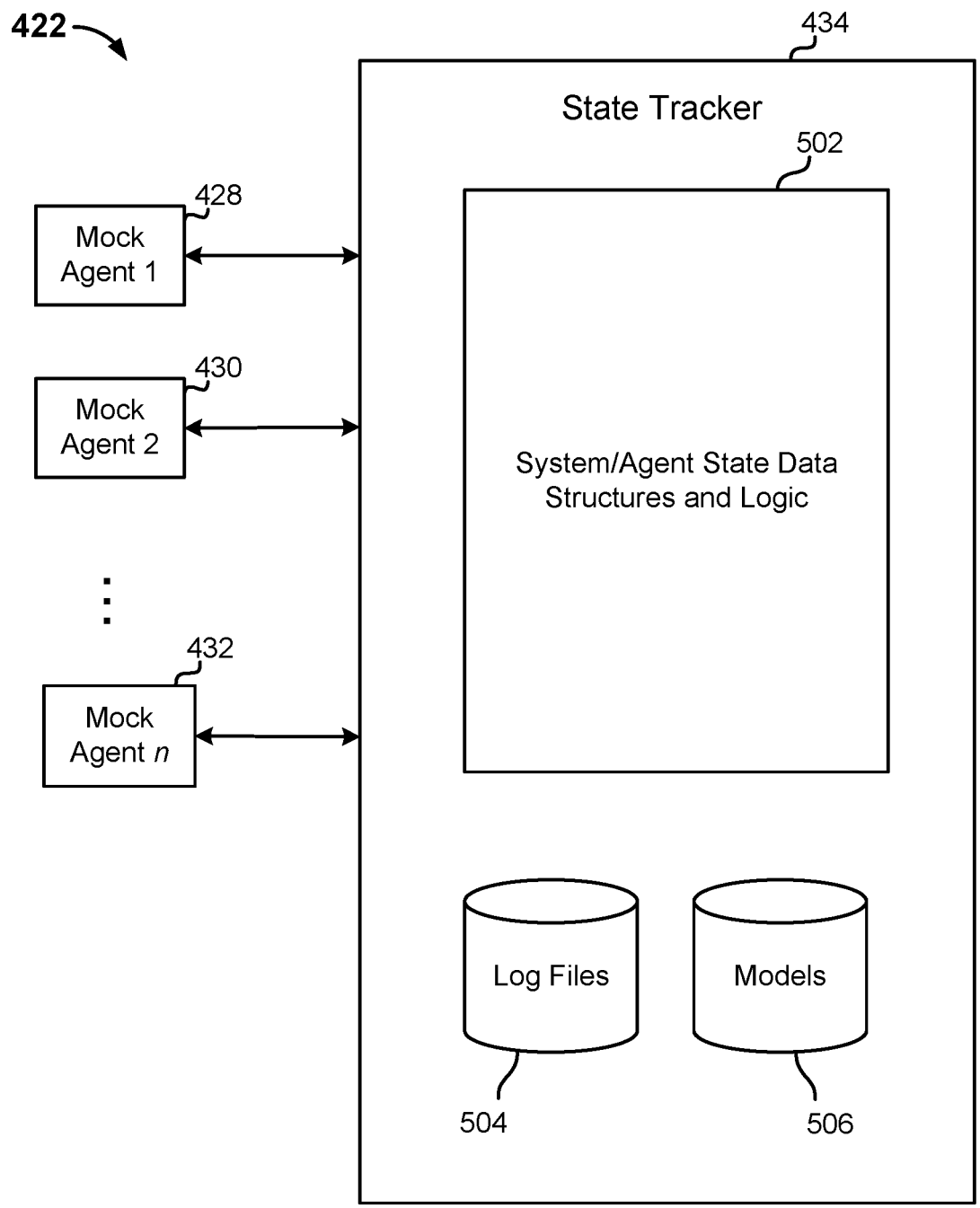
FIG. 5A is a block diagram illustrating an embodiment of a robotic system simulation engine.

FIG. 5A is a block diagram illustrating an embodiment of a robotic system simulation engine. In various embodiments, the system of FIG. 5A is used to implement simulator 422 of FIG. 4B. In the example shown, state tracker 434 of FIG. 4B includes a set of system state data structures and associated logic 502. The data structures may include one or more tables or other data structures that are read and/or updated by mock agents 428, 430, 432, e.g., as actions are simulated as being performed in response to schedules received by dispatcher 406 and communicated to mock agents 428, 430, 432 for simulated execution. Individual actions, results of actions, and other events may be logged, e.g., by mock agents 428, 430, 432, in log files 504. In some embodiments, each mock agent 428, 430, 432 and/or each resource that a robotic element may operate on (e.g., trays or other receptacles, etc.) may be represented in log files 504 by a separate log file or document.

The mock agents 428, 430, 432 use models 506, in various embodiments, to determine how long and/or in what specific and/or granular manner each action would be performed by the robotic element (e.g., robotic arm) the behavior of which that mock agent 428, 430, 432 is configured to simulate.

In various embodiments, the simulation/state logic 502 includes logic to detect actual or constructive collisions or other inconsistencies and/or incompatible operations. For example, in some embodiments, logic 502 would detect if two or more robotic arms have been updated as being in the same three-dimensional space at the same time. In some embodiments, swing circles (or other 2D or 3D shapes or volumes) are computed for each robotic arm, e.g., based on a current position and pose (e.g., orientation of arm segments, etc.) of each robot. If the swing circle (or other shape or volume) of two robots intersect, an exception event is triggered. In some embodiments, each mock agent determines before posting an update of simulated action whether a contemplated action is consistent with the current system state. If not, for example if by taking the action the robot would collide with another robot or an object in the workspace, the mock agent does not post that action. In some embodiments, the mock agent may reattempt the action, e.g., after a prescribed delay period. If the retry fails, the mock agent may inform the dispatcher of the failure.

Figure 5B:
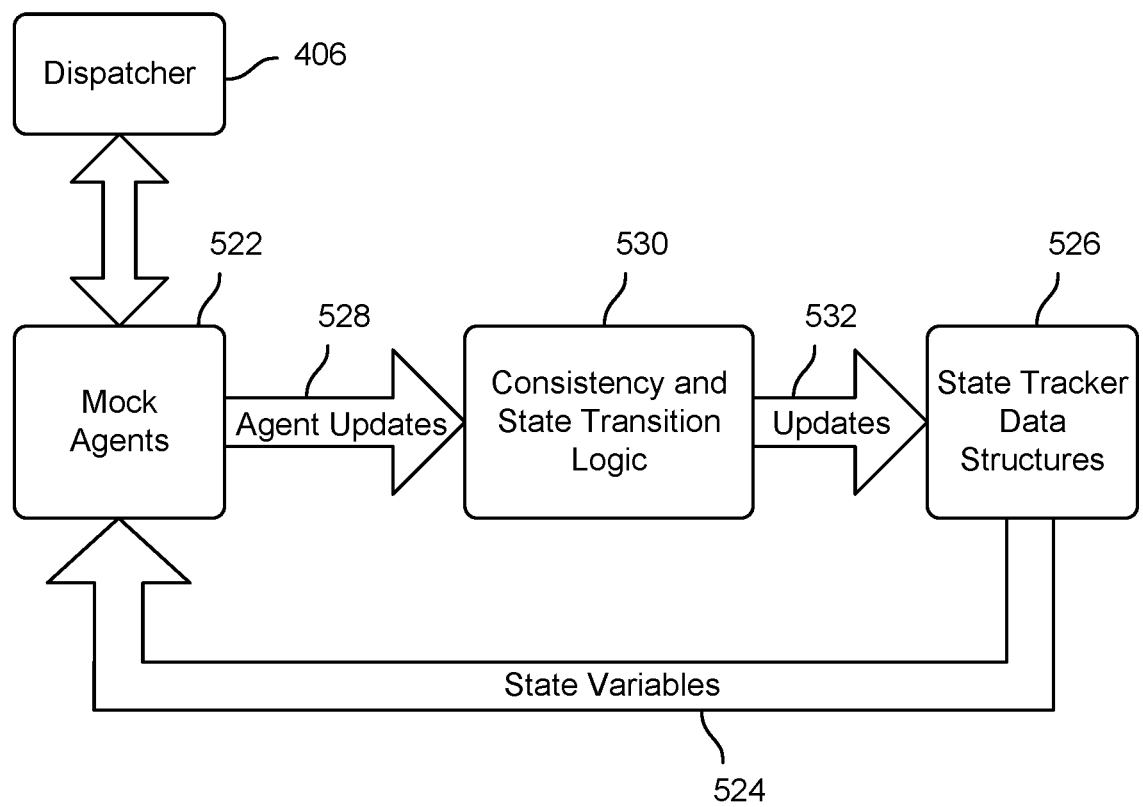
FIG. 5B is a functional flow diagram illustrating an embodiment of a process to simulate a robotic system.

FIG. 5B is a functional flow diagram illustrating an embodiment of a process to simulate a robotic system. In the example shown, dispatcher 406 assigns actions to mock agents 522 to be performed. The mock agents 522 read state variables 524 from state tracker data structures 526 and use the state information (and robot/other resource specific models) to simulate performance of the action(s) assigned by dispatcher 406, including by determining the respective updated value of one or more state variables to reflect the end state that would result from simulated performance of the action. The mock agents provide the updates 528 to consistency and state transition logic 530.

In various embodiments, the consistency and state transition logic 530 validates each update 528, e.g., to ensure not too robots or other elements would be in an inconsistent or otherwise disallowed state (e.g., collision between two robotic arms). If the updates are allowed, the consistency and state transition logic 530 writes the updates 532, including updates if any to global or other state variables as determined by consistency and state transition logic 530 based on the updates 528 received from the mock agents 522, to appropriate locations in the state tracker data structures 526. The above process repeats as successive subsequent sets of actions are assigned to mock agents 522 by dispatcher 406.

In various embodiments, to simulate performance of an action assigned by dispatcher 406, the mock agents 522 may provide a series of updates 528, e.g., at a prescribed interval and/or upon simulated completion of each of a plurality of sub-actions simulated as being performed by a robot or other resource the mock agent is configured to simulate. In this manner, intermediate states between a state of the robot or other resource at the start of the action and an ending state upon completion, may be simulated, and collisions or other problems that may occur while the robot or other resource is in such an intermediate state may be detected. For example, by simulating intermediate positions/states, a collision between two robotic arms on opposite rails, in the example shown in FIG. 3 for example, may be detected.

Figure 6:
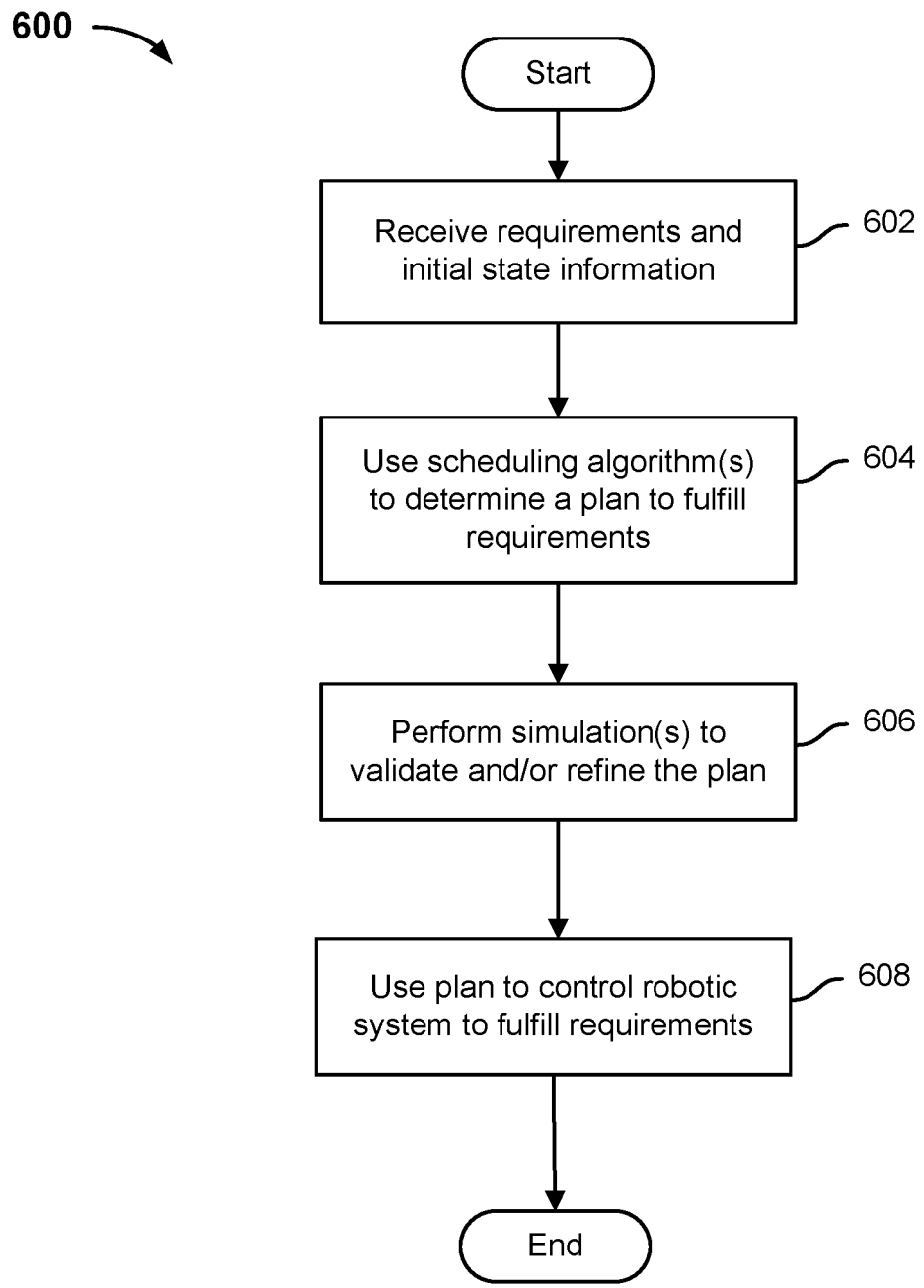
FIG. 6 is a flow diagram illustrating an embodiment of a process to control a robotic system.

FIG. 6 is a flow diagram illustrating an embodiment of a process to control a robotic system. In various embodiments, the process 600 of FIG. 6 may be performed by one or more components, modules, or processes running on one or more control computers, such as control computer 122 of FIG. 1. In the example shown, at 602, requirements and initial state information are received. For example, in the example shown in FIGS. 4A and 4B, at 602 scheduler 402 may receive order information from order management system 404 and state information from internal state machine 416. At 604, scheduling algorithms are used to determine a plan to fulfill the requirements received at 602 in light of the state information received at 602. At 606, one or more simulations are performed, e.g., as disclosed herein, to validate and/or refine the plan determined at 604. At 608, the plan is used to control the robotic system to fulfill all or part of the requirements received at 602. For example, the plan may be used, e.g., by dispatch 406 of the example shown in FIGS. 4A and 4B, to control one or more robotic arms or other robotic elements.

In various embodiments, successive and/or ongoing or continuous iterations of one or more of steps 602, 604, and 606 may be performed as/if needed to generate, regenerate, validate, and/or refine a plan. For example, as a first plan or portion thereof is performed, state and/or order information may be updated in a way that results in a new or updated plan being generated, validated, and/or refined. Successive iterations may be repeated until all requirements have been fulfilled.

Figure 7:
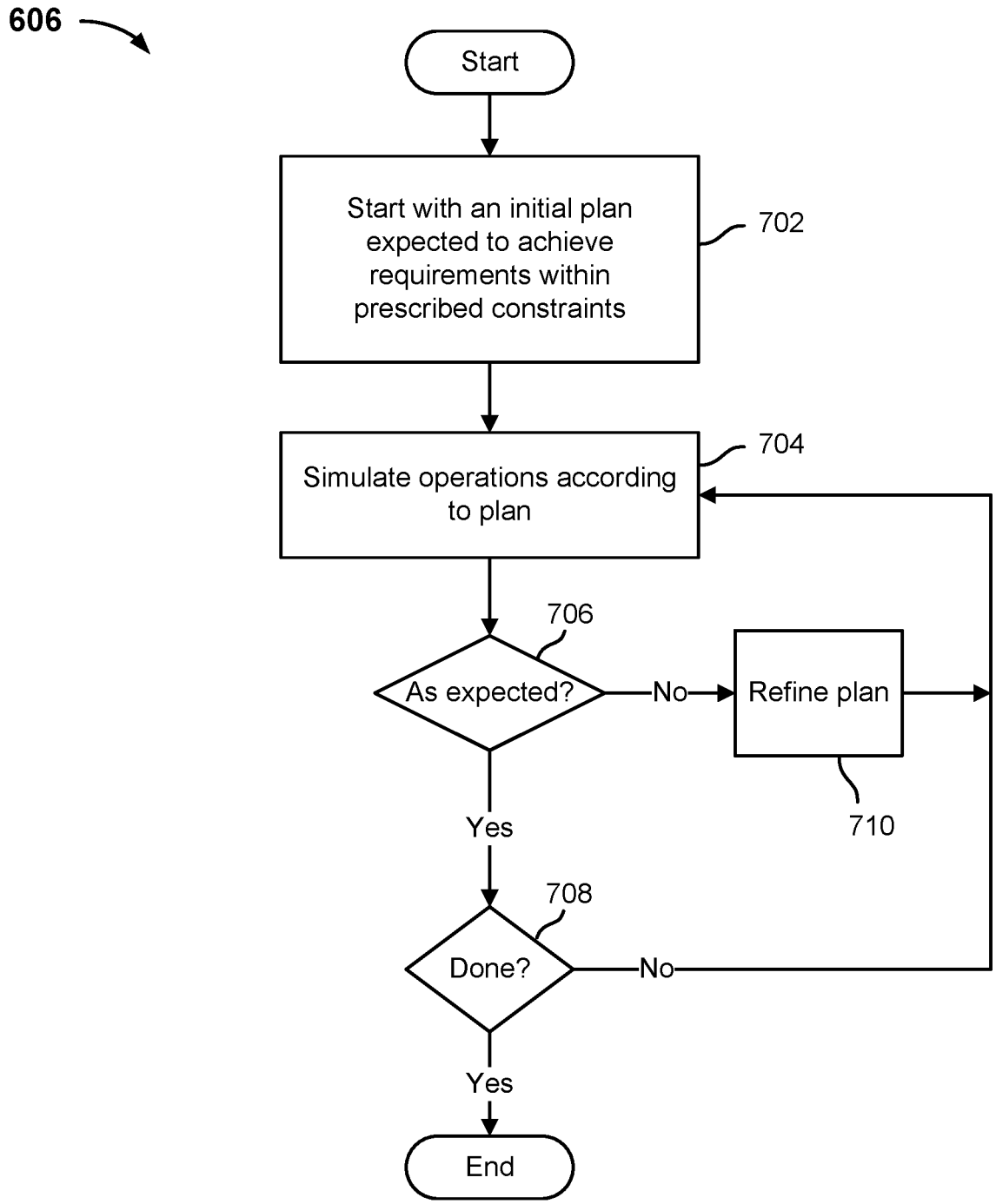
FIG. 7 is a flow diagram illustrating an embodiment of a process to perform simulation(s) to validate and/or refine a plan.

FIG. 7 is a flow diagram illustrating an embodiment of a process to perform simulation(s) to validate and/or refine a plan. In various embodiments, the process of FIG. 7 is used to implement step 606 of FIG. 6. In the example shown, at 702, the process starts with an initially-received plan expected to achieve system requirements (e.g., fulfill a set of product orders) within prescribed constraints (e.g., within a given workday or other work period). For example, a plan generated, initially without simulation, e.g., one generated by applying one or more scheduling algorithms, may be received.

At 704, operations according to the initial (or current) plan are simulated, e.g., as disclosed herein. If/while at 706 the simulated operations proceed as expected (or within prescribed and/or configured or configurable tolerances of what is expected, according to the plan), simulated processing continues according to the plan, until determined at 708 to be done or unless/until it is determined at 706 that the simulated operations have not proceeded as expected. For example, at 706, an indication may be received or a determination otherwise made that a scheduled action cannot or has not been completed successfully as simulated. Or, an unexpected event or behavior of the robot or other actor or resource may be detected.

If it is determined at 706 that the simulated operations have not proceeded as expected, then at 710 the plan (schedule) is refined. For example, a scheduler may be updated (via the dispatcher) with information indicating the problem that occurred in simulated operations according to the original/previous plan. The scheduler may include logic and/or processes to generate a refined (or new) plan that avoids the problem encountered in the simulation. For example, a different robot may be assigned to perform an action, or actions may be reordered or the timing or one or more actions otherwise changed (e.g., delayed, made sequential instead of simultaneous, etc.) to avoid the problem encountered in and/or anticipated by the simulation. Once a refined plan has been generated at 710, then at 704 simulation resumes, based on the refined plan.

Successive iterations of steps 704, 706, and 710 may be performed to refine or further refine the plan, as needed, e.g., as problems are encountered in the operations as simulated.

Figure 8:
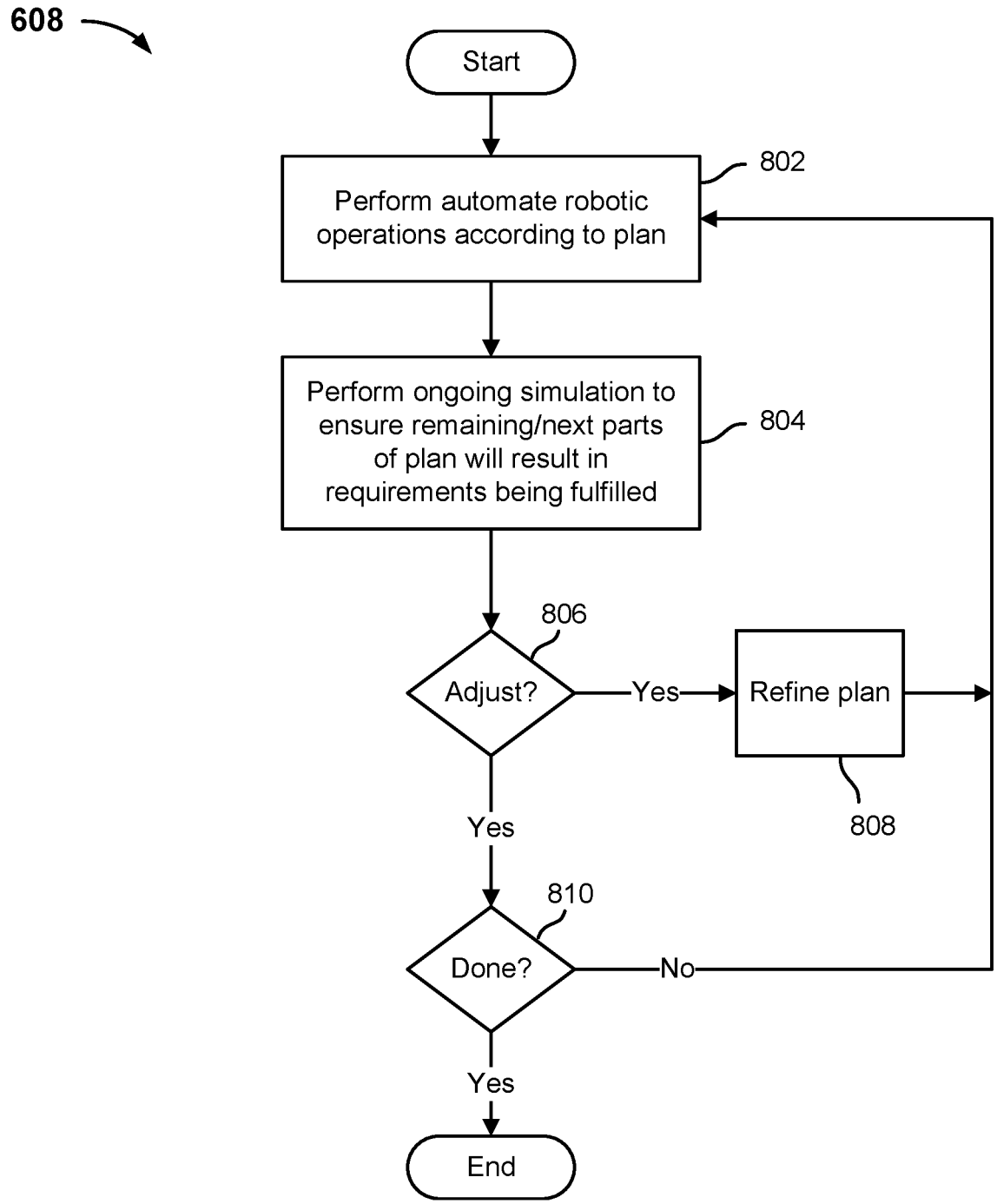
FIG. 8 is a flow diagram illustrating an embodiment of a process to use a plan to control a robotic system.

FIG. 8 is a flow diagram illustrating an embodiment of a process to use a plan to control a robotic system. In various embodiments, the process of FIG. 8 is used to implement step 608 of FIG. 6. In the example shown, at 802, robotic operations are performed according to the (current) plan. For example, in the example shown in FIG. 4A, a plan generated by scheduler 402 may be provided to dispatcher 406, which in turn implements the plan by assigning actions to agents 408, 410, 412 configured to control corresponding robotic elements (e.g., robotic arms, other robots) to perform the actions. At 804, ongoing simulation is performed to ensure that remaining/upcoming parts of the plan will result in requirements being fulfilled without collisions or other errors. For example, the actions assign by dispatcher 406 to real agents 408, 410, 412 may also (or first) be provided to mock agents 428, 430, 432 for simulated performed of the actions. If at 806 it is determined that the simulation indicates a problem with (or potential for and/or need for improvement in) the plan, then at 808 the plan is refined and the refined plan begins to be used at 802 to control and at 804 to simulate operation of the robotic system. The process continues until done (810), e.g., all requirements have been fulfilled.

In various embodiments, simulation may be performed with respect to robotic and/or other operations at multiple physical locations to achieve a global objective, e.g., to minimize a global cost function. For example, FIGS. 1, 2, and 3 illustrate examples of a robotic system used to fill orders, such as at a warehouse or other distribution center. In some embodiments, simulation may be performed as well with respect to one or more destinations to which items are to be shipped. For example, a plan may be made to assemble trays or other receptacles for shipment/delivery to respective destinations, such as retail outlets or further (e.g., regional or local) distribution nodes, and in various embodiments operation of a robotic system at the source location is performed and in addition robotic and/or non-robotic (e.g., manual/human) operations at each of one or more destinations may be simulated, to generate, validate, and/or refine a plan to assemble trays/kits at the distributions node (source) in a manner that does not result in inefficiencies or conflicts at the destination node(s).

Figure 9A:
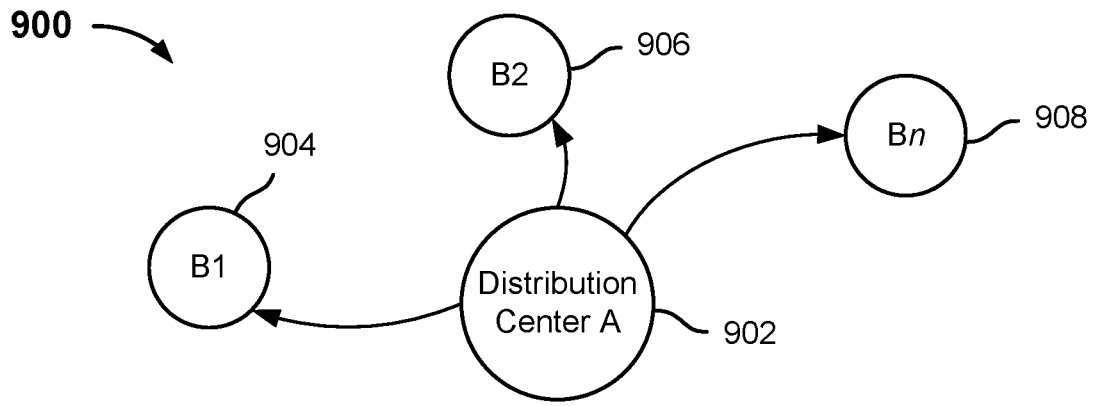
FIG. 9A is a diagram illustrating an example of optimizing across multiple physical locations in an embodiment of a robotic system simulation engine.

FIG. 9A is a diagram illustrating an example of optimizing across multiple physical locations in an embodiment of a robotic system simulation engine. In the example shown, distribution network 900 includes a distribution center 902 and a plurality of destinations to which items are shipped from distribution center 902, represented in FIG. 9A by destinations 904, 906, and 908. In various embodiments, a first robotic system (e.g., FIGS. 1 through 4) is deployed at distribution center 902, e.g., to fulfill orders to deliver respective quantities of respective items to destinations such as 904, 906, and 908. In addition, in at least a subset of destinations such as 904, 906, and 908, a destination robotic (or other) system is deployed, e.g., to received and unpack trays or other receptacles, pick and place items onto shelves, etc. In various embodiments, a simulation is performed with respect to operations at the distribution center 902 and at one or more of the destinations 904, 906, and 908, to determine and implement a plan that achieves requirements globally (end-to-end) across locations.

Figure 9B:
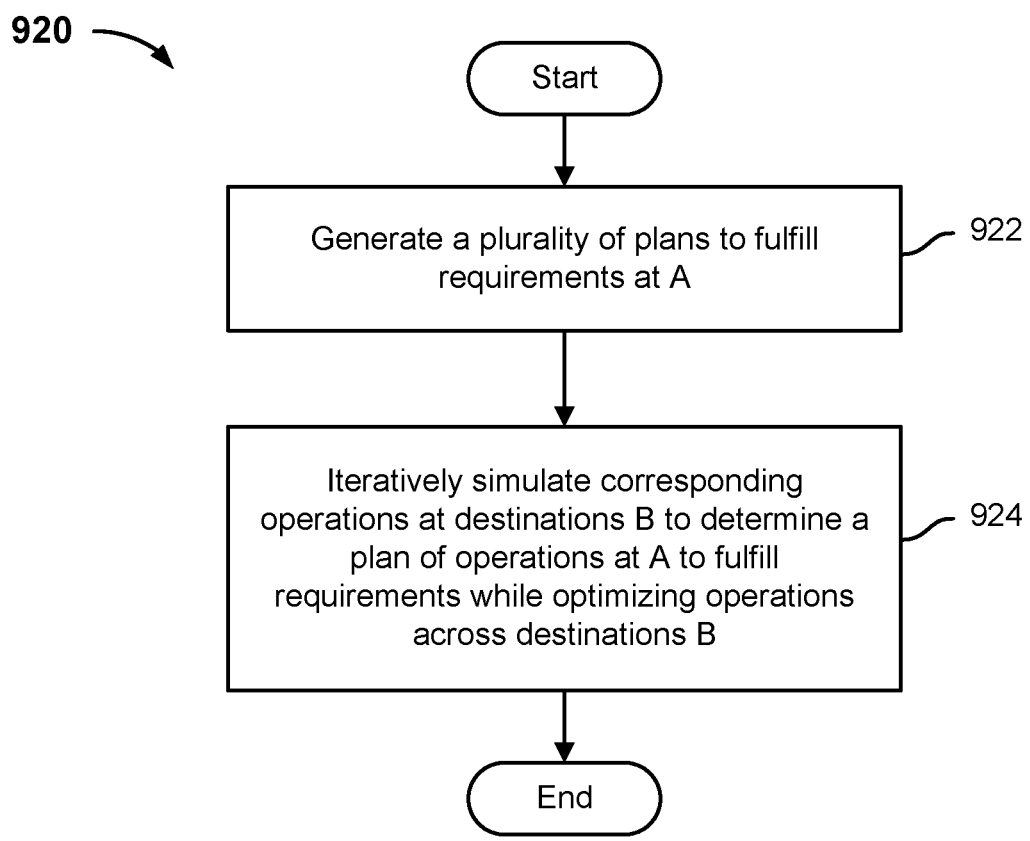
FIG. 9B is a flow diagram illustrating an embodiment of a process to optimize across multiple physical locations.

FIG. 9B is a flow diagram illustrating an embodiment of a process to optimize across multiple physical locations. In various embodiments, the process 920 may be performed to use simulation as disclosed herein to fulfill requirements in a manner that takes into account objectives and requirements across locations. In the example shown, at 922, candidate plans are generated to fulfill a set of requirements through robotic system operations at a first location. For example, scheduling algorithms may be applied to generate a set of candidate plans. The respective candidate plans may be scored, ranked, or otherwise weighed relative to each other with respect to a cost function (e.g., one that considers time, energy usage, robot utilization rates, other measures of efficiency, etc.) applicable to the first location. One or more of the higher (highest) ranked/scored plans may be simulated to validate and/or refine the plan with respect to the first location.

At 924, the top n plans are simulated at and/or with respect to each of one or more destination locations to determine a cost associated with the plan with respect to that destination. The destination location costs associated with each plan as simulated at each location are aggregated and added to the cost at the first location to generate a total cost. The plan with the lowest total cost may be selected and/or further refined to determine and implement a final plan.

In various embodiments, techniques disclosed herein may be used to generate, validate, and refine plans to control a robotic system to fulfill a set of requirements. Scheduling algorithms may be applied in a computational feasible way to determine plans the performance of which can be validated and/or refined in real time through simulation, as disclosed herein, to anticipate and avoid real world problems that may otherwise be encountered.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a communication interface; and
a processor coupled to the communication interface and configured to:
receive from a robotic control system, via the communication interface, a communication indicating an action to be performed by a robotic element;
simulate performance of the action by the robotic element;
update a state tracking data to reflect a virtual change to one or more state variables as a result of simulated performance of the action; and
report to the robotic control system, via the communication interface, successful completion of the action by the robotic element,
wherein the action is included in a first set of actions that the processor is configured to simulate at a first physical location, and wherein the processor is further configured to simulate a second set of actions at a second physical location and the robotic control system is configured to use the simulation of the first set of actions and the simulation of the second set of actions to determine a plan to perform operations at the first physical location,
wherein the first physical location is a source location of an item, and
wherein the second physical location is one or more destinations to which the item is to be shipped.

2. The system of claim 1, further comprising a memory coupled to the processor and configured to store the state tracking data.

3. The system of claim 1, wherein the action indicated in the communication is determined by the robotic control system according to a plan generated by the robotic control system to fulfill a set of requirements using a set of robotic elements that includes the robotic element.

4. The system of claim 3, wherein the robotic control system is configured to use a simulation result generated based at least in part on the simulated performance of the action by the robotic element to validate or refine the plan.

5. The system of claim 3, wherein the communication is received from the robotic control system and the report is sent to the robotic control system via a same interface used by the robotic control system to communicate with a non-simulated agent configured to control operation of the robotic element to perform the action in a real, physical world.

6. The system of claim 1, wherein the processor is further configured to emulate a robotic control agent associated with the robotic element.

7. The system of claim 1, wherein the processor is configured to simulate performance of the action by the robotic element at least in part by using a model comprising data that represents a physical configuration and dynamic behavior characteristics of the robotic element.

8. The system of claim 7, wherein the model includes data indicating an amount of time associated with performance of the action by the robotic element.

9. The system of claim 1, wherein the robotic element comprises a robotic arm having an end effector.

10. The system of claim 9, wherein the action includes using the robotic arm and the end effector to pick the item from the source location and place the item in a destination location.

11. The system of claim 10, wherein the source location comprises a source tray or other source receptacle and the destination location comprises a destination tray or other receptacle.

12. The system of claim 1, wherein the processor is configured to detect an error condition associated with simulated performance of the action by the robotic element.

13. The system of claim 12, wherein the processor is configured to provide to the robotic control system a feedback data representing the error condition.

14. The system of claim 13, wherein the robotic control system is configured to refine a plan based at least in part on the feedback data.

15. The system of claim 1, wherein the processor is further configured to determine an associated cost with implementing the determined plan.

16. A method, comprising:
receiving from a robotic control system, via a communication interface, a communication indicating an action to be performed by a robotic element;
simulating performance of the action by the robotic element;
updating a state tracking data to reflect a virtual change to one or more state variables as a result of simulated performance of the action; and
reporting to the robotic control system, via the communication interface, successful completion of the action by the robotic element,
wherein the action is included in a first set of actions that a processor is configured to simulate at a first physical location, and wherein the processor is further configured to simulate a second set of actions at a second physical location and the robotic control system is configured to use the simulation of the first set of actions and the simulation of the second set of actions to determine a plan to perform operations at the first physical location,
wherein the first physical location is a source location of an item, and
wherein the second physical location is one or more destinations to which the item is to be shipped.

17. The method of claim 16, wherein the action indicated in the communication is determined by the robotic control system according to a plan generated by the robotic control system to fulfill a set of requirements using a set of robotic elements that includes the robotic element.

18. The method of claim 17, wherein the robotic control system is configured to use a simulation result generated based at least in part on the simulated performance of the action by the robotic element to validate or refine the plan.

19. The method of claim 17, wherein the communication is received from the robotic control system and the report is sent to the robotic control system via a same interface used by the robotic control system to communicate with a non-simulated agent configured to control operation of the robotic element to perform the action in a real, physical world.

20. A computer program product embodied in a non-transitory computer readable medium and comprising computer instructions for:
receiving from a robotic control system, via a communication interface, a communication indicating an action to be performed by a robotic element;
simulating performance of the action by the robotic element;
updating a state tracking data to reflect a virtual change to one or more state variables as a result of simulated performance of the action; and
reporting to the robotic control system, via the communication interface, successful completion of the action by the robotic element,
wherein the action is included in a first set of actions that a processor is configured to simulate at a first physical location, and wherein the processor is further configured to simulate a second set of actions at a second physical location and the robotic control system is configured to use the simulation of the first set of actions and the simulation of the second set of actions to determine a plan to perform operations at the first physical location,
wherein the first physical location is a source location of an item, and
wherein the second physical location is one or more destinations to which the item is to be shipped.

* * * * *